United States Patent [19]

Heban, Jr.

[11] Patent Number: 4,805,518

[45] Date of Patent: Feb. 21, 1989

[54] PISTON

[75] Inventor: Norb A. Heban, Jr., Rossford, Ohio

[73] Assignee: Dana Corporation, Toledo, Ohio

[21] Appl. No.: 604,760

[22] Filed: Apr. 27, 1984

Related U.S. Application Data

[63] Continuation of Ser. No. 334,959, Dec. 28, 1981, abandoned.

[51] Int. Cl.[4] ................................................ F16J 1/14
[52] U.S. Cl. ........................................ 92/189; 92/216;
92/219; 92/190; 123/193 P
[58] Field of Search ............. 123/193 P; 92/187, 189,
92/190, 216, 219, 208

[56] References Cited

U.S. PATENT DOCUMENTS

| | | | |
|---|---|---|---|
| 2,126,627 | 9/1938 | Fiedler | 92/189 |
| 3,448,664 | 6/1969 | Hulsing | 92/190 X |
| 3,555,972 | 1/1971 | Hulsing | 92/190 X |
| 3,995,538 | 12/1976 | Beardmore et al. | 92/190 |
| 4,253,430 | 3/1981 | Garter et al. | 123/193 P X |

Primary Examiner—Ira S. Lazarus
Assistant Examiner—Peggy Neils
Attorney, Agent, or Firm—Robert Leonardi

[57] ABSTRACT

A crosshead piston 10 comprises a head member 18 and a skirt member 20, each of which can be secured independently to a piston pin 14. The skirt 20 has a reduced diameter upper end portion 66 which fits within lower end 24 of the head member ring belt portion 23, thereby exposing maximum head member surface area to a cylinder or cylinder sleeve wall for cooling. Preferably, the skirt end portion 66 defines a seal groove 32 which contains a metal ring 67 for sealing the gap 62 between the head member and skirt member.

6 Claims, 1 Drawing Sheet

PISTON

This application is a continuation of Ser. No. 334,959, filed 12/28/81 now abandoned.

BACKGROUND OF THE INVENTION

The present invention relates generally to pistons for internal combustion engines and more particularly to two-piece or crosshead-type pistons.

Crosshead type pistons in which the head and skirt members are separate and independently connected to the piston pin are well known and are preferred in many applications, such as in heavy duty two stroke diesel engines. One advantage of this type of piston is that the skirt member generally bears all of the side thrust applied to the piston through the connecting rod, leaving the head member to transmit only axially directed forces from the combustion chamber. Another advantage is that the skirt member may be made of less expensive materials because it is not exposed to the forces of the combustion chamber.

One problem associated with crosshead type pistons is excessive heat build-up, particularly in the head member which is exposed to the combustion chamber. In one-piece pistons, heat from the piston crown can be transferred directly to the piston skirt for dissemination. However, in crosshead pistons with the head member separate from the skirt, heat which otherwise could be directly transferred to the skirt can be dispersed no further than the ring belt section—the cylindrical portion of the head just below the crown which usually contains piston rings. The exterior surface of the ring belt section is exposed to the cylinder wall (typically a cylinder liner in heavy duty engines) which draws heat from the head member.

The head member heat build-up problem becomes more pronounced as the size of the head is reduced. There is a tendency to make the head member as small as possible because more expensive materials and/or processing is used in the head member.

The problem is further complicated because the head member, particularly the ring belt section, usually has a reduced diameter section which fits into the skirt member, thereby reducing the area of the ring belt which is exposed to the cylinder wall.

SUMMARY OF THE INVENTION

The present invention helps to alleviate the heat build-up problem in crosshead pistons by exposing more of the head member surface area to the cylinder wall without increasing the size or amount of material used in the head member. A unique sealing arrangement is also provided at the junction of the head and skirt members.

More specifically, the present invention is an improved crosshead piston wherein the skirt member has a reduced diameter upper end portion which is positioned within the lower end portion of the head member. Preferably, the reduced diameter skirt portion has an annular groove which contains a seal ring in engagement with the lower end portion of the head member.

DESCRIPTION OF A PREFERRED EMBODIMENT

Figure 1:
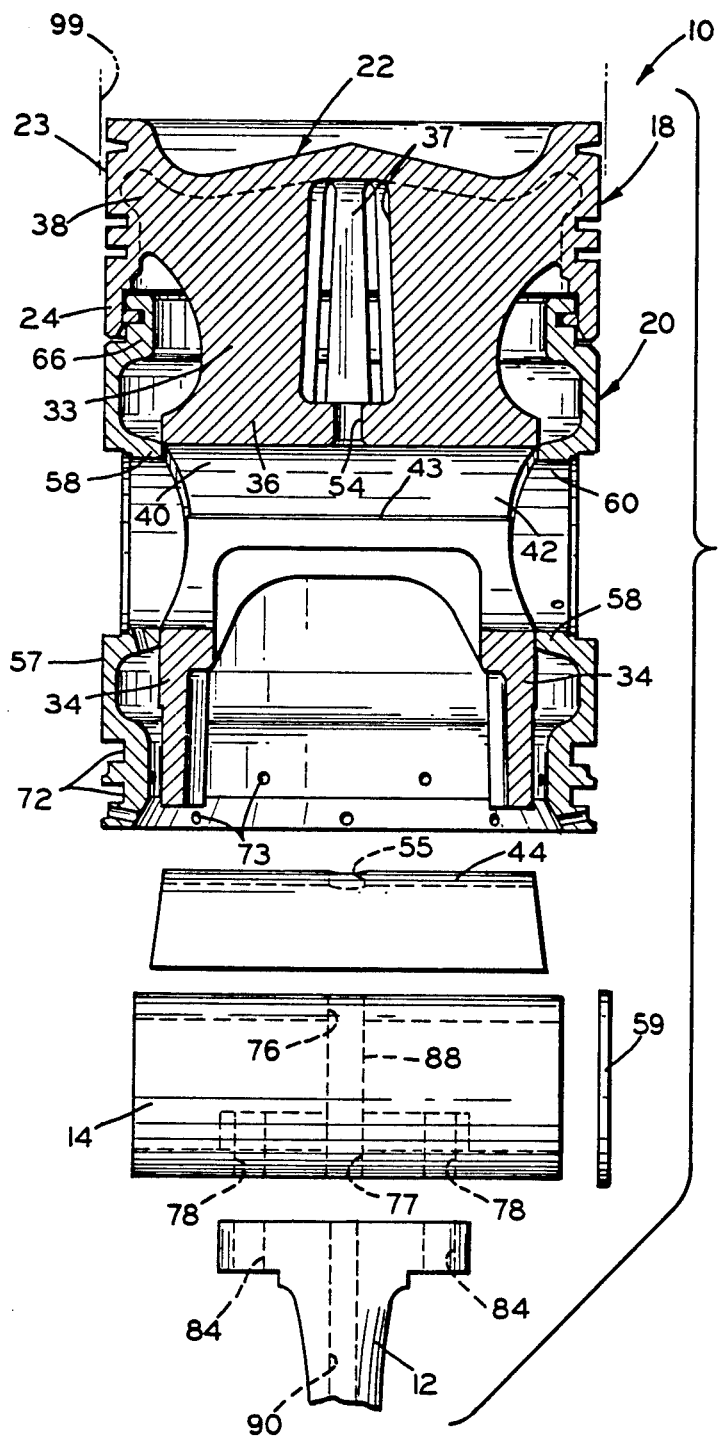
FIG. 1 is a partially exploded cross-sectional view of the piston assembly of the present invention.

FIG. 1 illustrates a crosshead piston 10 along with a connecting rod 12 and a piston pin 14. The piston includes a head member 18 and a skirt member, or crosshead, 20, which are separately formed, preferably of cast iron. The skirt 20 is formed of ductile cast iron while the head 18 is formed of malleable cast iron, which is more expensive to process, but which is more suitable for exposure to a combustion chamber.

The upper portion of the piston head 18 comprises a crown section 22 which forms a combustion chamber defining wall. Depending from the outer edge of the crown section is an outer cylindrical ring belt section 23 in which are formed three compression ring grooves.

The piston head 18 further includes a piston pin connecting section 33 comprising a pair of spaced downwardly (as viewed in FIG. 1) extending pin encircling arms 34 having piston pin openings 42. The arms are interconnected at their upper ends by a saddle 36 which is in turn connected with the crown section by a plurality of axially and radially extending struts or columns 37. Columns 37 include radially outwardly extending rib portions 38 integrally connecting the columns with the ring belt section 23 and with the outer portions of the crown section 22.

Saddle 36 defines a downwardly opening semicylindrical recess 40. Recess 40 terminates circumferentially in a pair of radial shoulders 43 which retain a semicylindrical bearing insert 44 having an inwardly facing bearing surface preferably containing a plurality of grooves (not shown) for the distribution of lubricant thereover. Oil supply openings 54 and 55 are provided in the centers of the saddle portion and bearing insert respectively.

The crosshead or skirt member 20 comprises generally a cylindrical wall 57 having a pair of centrally located oppositely disposed, and inwardly extending bosses 58. Each boss 58 defines a cylindrical pin receiving opening 60 which, when the head member and skirt member are assembled, are axially aligned with the pin encircling openings 42 of the head member pin connecting section. At this lower end, skirt 20 has two oil ring grooves 72 for suitable oil scraper rings. Below each groove 72 are a plurality of oil drain holes 73 to carry away oil from the oil rings in a conventional manner.

The head and skirt members of the piston assembly are retained together by the cylindrical piston pin 14 which is received in openings 60 and 42 of the skirt and head members, respectively, and engages the bearing insert 44 across a substantial portion of its upper surface. The connecting rod 12 is secured to the piston pin 14 by bolts (not shown) which extend through openings 84 in the connecting rod and 78 in the pin in a manner well known in the art.

Piston pin 14 is hollow, having a slightly thickened wall at its center where oppositely disposed upper and lower openings 76 and 77, respectively, are provided. A tube 88 is aligned with openings 76 and 77 to provide an oil passage through the pin. Tube 88 is aligned with a drilled oil passage 90 extending lengthwise through the connecting rod 12. Metal closure plates 59 seal each end of the hollow pin 14 as is well known in the art.

Figure 2:
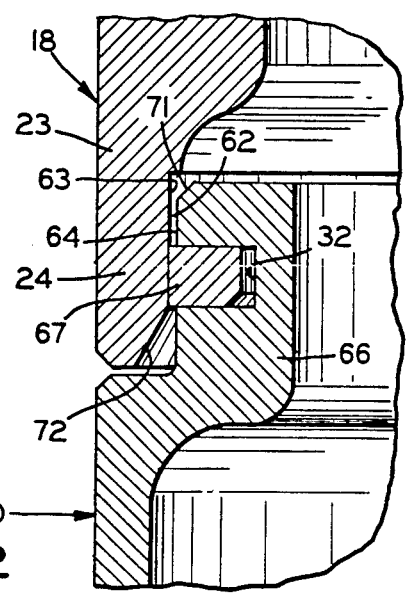
FIG. 2 is an enlarged cross-sectional view of the seal between the head and skirt members of FIG. 1.

As more clearly shown in FIG. 2, the upper end of the skirt 20 has an enlarged wall 66 which is cast approximately three times as thick as the other areas of the skirt wall. The radially outer portion of wall 66 is machined away to provide a reduced diameter end portion having a cylindrical surface 64 defining a cylinder. The ring belt lower wall 24 which receives the upper end skirt wall 66 is also machined as its lower end portion to create an enlarged diameter interior cylindrical surface 63. It should be noted that the head member 18 and the skirt member 20 are designed to operate without contacting each other near the interface area shown in FIG. 2. Each member 18 and 20 is secured to the piston pin independently, as previously described.

A narrow annular gap 62 exists between the inner cylindrical surface 63 of the head member and the outer reduced diameter cylindrical surface 64 of the skirt 20. This gap permits a slight rocking of the skirt 20 under the angular piston rod forces but prevents these angular forces from being transferred thru the skirt to the head member 18. Beveled annular surfaces 71 and 72 on the skirt and head members, respectively, aid in assembly and in the limited movement of the skirt.

The gap 62 is sealed by a cast iron sealing ring 67 which allows relative sliding or rocking movement between the head and skirt members without deterioration of the ring 67 and without breaking the seal between the members. The ring 67 has a tight end gap in the range of 0.003 inches, which is possible because the ring experiences little heat expansion due to the piston design. The seal ring is received in the seal groove 32 which is cut into circumferential surface 64 of the skirt. It is widely preferred that the seal groove be cut into a circumferential surface such as 64 to allow ring 67 to engage a cylindrical surface such as 63. This sealing arrangement is believed to be more effective during any sliding or rocking between the head and skirt members than previously known designs which used elastomeric sealing rings, or which relied upon seals between radial or conical surfaces.

It can be seen that the ring belt section 23, by virtue of the present invention in which the head member extends over the skirt member, is lengthened and has an overlap or receiving portion 24, the external surface of which is exposed to a cylinder or cylinder sleeve wall 99, thereby allowing an associated cylinders or cylinder sleeve wall to draw more heat from the head member. The additional exposed area is created without increasing the size or the material used in the head, as compared to similar designs in which the head member is received within the skirt.

Although the previously described embodiment of the invention is preferred presently, numerous modifications or variations are within the scope of this invention as defined in the following claims.

What is claimed is:

1. A crosshead piston assembly comprising:
   a skirt member having means for drivingly engaging a piston pin and a radially outer cylindrical surface for close sliding association with a cylinder wall,
   a head member formed separately from said skirt member, said head member having a crown for exposure to a combustion chamber, a radially outer cylindrical surface for close sliding association with said cylinder wall, said skirt cylindrical surface being coaxial with said head cylindrical surface, and means for drivingly engaging a piston pin independently of said skirt member;
   said skirt member having a reduced diameter end portion defining a skirt cylinder, said skirt cylinder received within said head member;
   said head member having a radially inner cylindrical surface adjacent an end portion thereof defining a head cylinder, said skirt cylinder received within said head cylinder, wherein said skirt cylinder and said head cylinder are substantially coaxial and wherein said skirt cylinder diameter is less than said head cylinder diameter, whereby a cylindrical gap exists between said skirt cylinder and said head cylinder;
   said skirt member having a generally radially extending annular surface between said skirt cylinder and said skirt member radially outer cylindrical surface, wherein said head member end portion comprises a generally radially extending annular surface positioned coaxially and adjacent said radially extending annular skirt surface, wherein a generally radially extending annular gap exists between said generally radially extending head and skirt surfaces and adjacent said cylindrical gap; and
   an annular seal between said skirt cylinder and said head cylinder.

2. The assembly as defined in claim 1 further comprising an annular seal groove in one of said skirt cylinder and said head cylinder, said seal positioned in said groove and in engagement with the other of said skirt cylinder and said head cylinder to form a seal between said skirt cylinder and said head member.

3. The assembly as defined in claim 2 wherein said seal groove is in said skirt cylinder.

4. The assembly as defined in claim 3 wherein said head cylinder has an enlarged diameter for receiving said skirt cylinder, wherein said seal is engaged with said enlarged diameter.

5. The assembly as defined in claim 4 wherein said seal is an annular metal ring generally rectangular in cross-section, wherein the outer cylindrical surface of said ring engages said head cylinder.

6. The assembly as defined in claim 5 wherein said head cylinder comprises a frusto-conical radially inner surface for engaging said rectangular cross-section metal ring during assembly, wherey said metal ring is biased radially inwardly by said frusto-conical surface during assembly.

* * * * *